(No Model.)

A. F. ROOT & C. B. MYERS.
CORN SHELLER.

No. 350,642. Patented Oct. 12, 1886.

WITNESSES:
Hans C. Nielsen
Chas. A. Inglis

INVENTOR
Adam F. Root
Christian B. Myers
BY
Wm. R. Gerhart
ATTORNEY

N. PETERS, Photo-Lithographer, Washington, D. C.

UNITED STATES PATENT OFFICE.

ADAM F. ROOT AND CHRISTIAN B. MYERS, OF MOUNT JOY, PENNSYLVANIA.

CORN-SHELLER.

SPECIFICATION forming part of Letters Patent No. 350,642, dated October 12, 1886.

Application filed April 1, 1886. Serial No. 197,414. (No model.)

*To all whom it may concern:*

Be it known that we, ADAM F. ROOT and CHRISTIAN B. MYERS, citizens of the United States, residing at Mount Joy, in the county of Lancaster and State of Pennsylvania, have invented certain Improvements in Corn-Shellers, of which the following is a specification.

Our invention relates to improvements in corn-shellers, in which, in connection with the mechanism for separating the grain from the cob, there is a delivery-pan actuated longitudinally. This pan receives the grain as delivered and carries it into any required receptacle.

The object of our improvement is to operate this delivery-pan with the least possible amount of friction. This we accomplish by the use an eccentric secured to the shaft carrying the shelling-cylinder and actuating a lever by which the said pan is operated. We attain this object by the mechanism illustrated in the accompanying drawings, in which—

Figure 1:
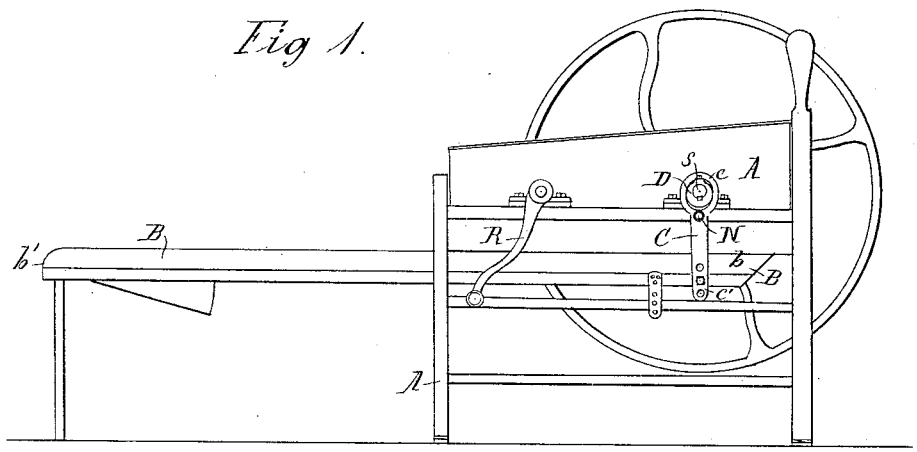
Figure 2:
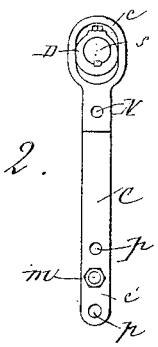
Figure 3:
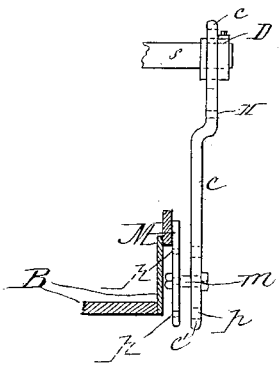

Figure 1 is a side view of our device; Fig. 2, a front view of the eccentric and lever; and Fig. 3 a side view of the same, showing the manner of connecting the lower end of the lever with the pan by means of the crank plate and bolt.

A represents the frame, in which is placed the shelling mechanism, and B the pan which receives the grain, which pan slopes from the receiving end $b$ to the distributing end $b'$ in order to deliver the grain. Longitudinal motion is communicated to this pan by means of a lever, C, the upper end, $c$, of which embraces the eccentric D, rigidly attached to the shaft S, carrying the shelling-cylinder, and the lower end, $c'$, of which is secured to the said pan. This lever is pivoted at a point, N, in such part of the frame as may be desired, to regulate the movement of the pan. The pan B has a plate, M, fastened to its side, between it and the lower end of the lever. This plate and the lever are both provided with a vertical series of bolt-holes, $p$, corresponding the one with the other, to receive the crank-bolt $m$. The bolt serves to connect the lever and plate and transmits the motion of the said lever to the pan. By this arrangement of the bolt-holes the point at which the parts are connected can be varied so as to regulate the length of the movement of the pan. The length of the lever is made adjustable, as described, in order that the force it communicates to the pan may be regulated to suit the strength of the person operating the sheller, that its power may be lessened when used by a man and increased when it is handled by a boy, as the application of too much power racks and jars the machinery to an injurious extent, and yet there must be sufficient force supplied to enable the pan to freely deliver the grain received by it.

Power may be applied to this device by means of a belt-wheel on the side opposite to that shown in Fig. 1 of the drawings, and by hand-power by the crank R connected by cog-gearing on the opposite side. These details are not more fully shown, as being well-known devices and not entering into the combination which we claim as novel.

We well know that an eccentric is frequently used in order to create movement in a lever-arm, and therefore we do not claim the same, broadly; but What we do claim as our invention, and desire to secure by Letters Patent, is—

1. The combination, in a corn sheller, of the frame, the cylinder shaft, and an eccentric attached to the end of said shaft, with a lever pivoted to the frame and actuated by the said eccentric, a pan for receiving the grain, a plate attached to the pan, the plate and the lower end of the lever being provided with corresponding series of bolt-holes, and a bolt for connecting the plate and lever, substantially as specified.

2. The combination, in a corn-sheller, of the frame, the cylinder-shaft, and an eccentric attached to the end of said shaft, with a lever pivoted to the frame and actuated by the said eccentric, the lower end of the lever being provided with a series of bolt-holes, a pan for receiving and delivering the grain, and a bolt passing through one of the bolt-holes and securing the lever to the pan, for the purpose specified.

ADAM F. ROOT.
CHRISTIAN B. MYERS.

Witnesses:
SAMUEL H. ECKHARDT,
CHAS. F. ECKHARDT.